(12) United States Patent
Hirst

(10) Patent No.: US 6,857,849 B2
(45) Date of Patent: Feb. 22, 2005

(54) MEMBRANE SEALS

(75) Inventor: Robert Hirst, Chellaston (GB)

(73) Assignee: Alston Technology Ltd., Baden (CH)

( * ) Notice: Subject to any disclaimer, the term of this patent is extended or adjusted under 35 U.S.C. 154(b) by 0 days.

(21) Appl. No.: 10/323,017

(22) Filed: Dec. 19, 2002

(65) Prior Publication Data

US 2003/0161725 A1 Aug. 28, 2003

(30) Foreign Application Priority Data

Dec. 22, 2001 (GB) .............................. 0130899

(51) Int. Cl.⁷ .............................................. F01D 25/26
(52) U.S. Cl. .................... 415/135; 415/174.2; 277/626; 277/644
(58) Field of Search ................ 415/136, 137, 415/138, 139, 174.2, 135, 134; 277/644, 626

(56) References Cited

U.S. PATENT DOCUMENTS

| | | |
|---|---|---|
| 4,188,037 A | 2/1980 | Abbes et al. |
| 5,158,430 A | 10/1992 | Dixon et al. |
| 5,624,227 A | 4/1997 | Farell |
| 5,634,766 A | 6/1997 | Cunha et al. |
| 5,716,158 A * | 2/1998 | Hahn et al. .................. 403/291 |
| 5,823,741 A | 10/1998 | Predmore et al. |
| 5,975,844 A | 11/1999 | Milazar et al. |
| 6,561,522 B1 * | 5/2003 | Radelet et al. ............... 277/628 |

* cited by examiner

*Primary Examiner*—Ninh H. Nguyen

(57) ABSTRACT

A membrane seal includes a pair of confronting annular sealing grooves. A first annular sealing member is received in one of the oppositely facing sealing grooves and a second annular sealing member is received in the other of the oppositely facing sealing grooves. The first and second sealing members are sealably connected together by an annular membrane. A pressure difference across the membrane forces the first and second sealing members into contact with a side wall of each of the oppositely facing sealing grooves to effect a seal. Known sealing members have a circular cross-section but in the present invention at least one of them has an oval cross-section. The oval cross-section gives the first and/or second sealing member(s) a larger zone of contact with the oppositely facing sealing groove(s). This reduces the amount of wear on the first and/or second sealing member(s) and produces a better seal.

21 Claims, 3 Drawing Sheets

MEMBRANE SEALS

BACKGROUND OF THE INVENTION

1. Field of the Invention

The present invention relates to membrane seals, and in particular to membrane seals for sealing between high-pressure and low-pressure regions of a gas turbine engine or jet engine.

2. Description of the Related Art

The background art will be explained with reference to FIG. 1. Membrane seals are a common way of providing a fluid-tight seal between different pressure regions and are typically found in gas turbine engines and jet engines. Membrane seals of the type with which the present invention is concerned include a first radially inner annular sealing member 2 and a second radially outer annular sealing member 4 sealably connected together by an annular membrane 6. Both the first and second sealing members 2, 4 have a circular cross-section. In FIG. 1 the first and second sealing members 2, 4 are shown to have a solid cross-section but they can be tubular. The first sealing member 2 is contained within an annular sealing groove 8a formed by a radially inner track 10a having a U-shaped cross-section. Similarly, the second sealing member 4 is contained within an annular sealing groove 8b formed by a radially outer track 10b having a U-shaped cross-section. The two tracks 10a, 10b are mounted on a radially inner and radially outer portion of a gas turbine engine casing (not shown) respectively.

The membrane seal is positioned between a low-pressure region 12 of the engine and a high-pressure region 14 of the engine. The axial width of the sealing grooves 8a, 8b is slightly wider than the axial width of the first and second sealing members 2, 4. This means that the first and second sealing members 2, 4 can slide axially within the sealing grooves 8a, 8b. When the gas turbine engine is operating, the difference in pressure between the low-pressure region 12 of the engine and the high-pressure region 14 of the engine forces the membrane seal in the direction of the arrows. The first sealing member 2 is therefore forced into contact with a side face 16a of the track 10a to effect a fluid-tight seal. Similarly, the second sealing member 4 is forced into contact with a side face 16b of the track 10b to effect a fluid-tight seal.

A major disadvantage with conventional membrane seals is that the first and second sealing members suffer from premature wear and thermal attrition caused by the high levels of vibration encountered in the gas turbine engine.

OBJECT OF THE INVENTION

An object of the present invention is therefore to provide a membrane seal that suffers less premature wear and produces a better seal.

FEATURES OF THE INVENTION

The present invention provides a membrane seal comprising:

a pair of oppositely facing annular grooves; and a first annular sealing member received in one of the oppositely facing grooves and a second annular sealing member received in the other of the oppositely facing grooves, the first and second sealing members being sealably connected together by an annular membrane and at least one of the first and second sealing members having an oval cross-section;

wherein a pressure difference across the membrane forces the first and second sealing members into contact with a side wall of each of the oppositely facing grooves to effect a seal.

Because at least one of the first and second members has an oval cross-section instead of a circular cross-section there is a larger zone of contact between the first and/or second sealing member(s) and the sealing groove(s). This reduces the amount of wear on the first and/or second sealing member(s) but still allows the membrane seal to be easily replaced if necessary. The larger zone of contact creates a better seal by providing a larger sealing area between the first and/or second sealing member(s) and the sealing groove (s).

Preferably, both of the first and second sealing members have an oval cross-section. However, if only one of the first and second sealing members has an oval cross-section then the other of the first and second sealing members preferably has a circular cross-section.

The first and second sealing members can be solid or tubular. The first and second members and the membrane are preferably integrally formed. The first and second members and the membrane are preferably formed from metal. However, it will be readily appreciated that they can also be formed from another suitable material.

The membrane seal can be formed as a single integral unit or from a plurality of separate membrane seal segments. In the latter case each membrane seal segment preferably includes an arcuate first sealing member and an arcuate second sealing member sealably connected together by an arcuate membrane. Each of the membrane seal segments has between 30 and 120 degrees of arc. It will be readily appreciated that the degree of arc is primarily determined by the number of membrane seal segments that make up the membrane seal. For example, if the membrane seal includes four membrane seal segments then each membrane seal segment will have 90 degrees of arc. However, all of the membrane seal segments do not necessarily have to have the same degree of arc.

To reduce fluid leakage through such a membrane seal, each of the membrane seal segments preferably includes a tongue along one of its radial edges and a groove along its other radial edge for receiving the tongue of an adjacent membrane seal segment. Alternatively, each membrane seal segment may include a rebate on one of its radial edges and a complementary rebate on its other radial edge for cooperating with the rebate of an adjacent membrane seal segment.

The invention also provides a gas turbine engine incorporating a membrane seal. The membrane seal is preferably positioned between a low-pressure region of the engine and a high-pressure region of the engine and the difference in pressure between the low-pressure region of the engine and the high-pressure region of the engine forces the first and second sealing members into contact with a side wall of each of the oppositely facing grooves to effect a seal.

DESCRIPTION OF THE PREFERRED EMBODIMENTS

The present invention will now be explained with reference to FIGS. 2 to 4b.

Figure 1:
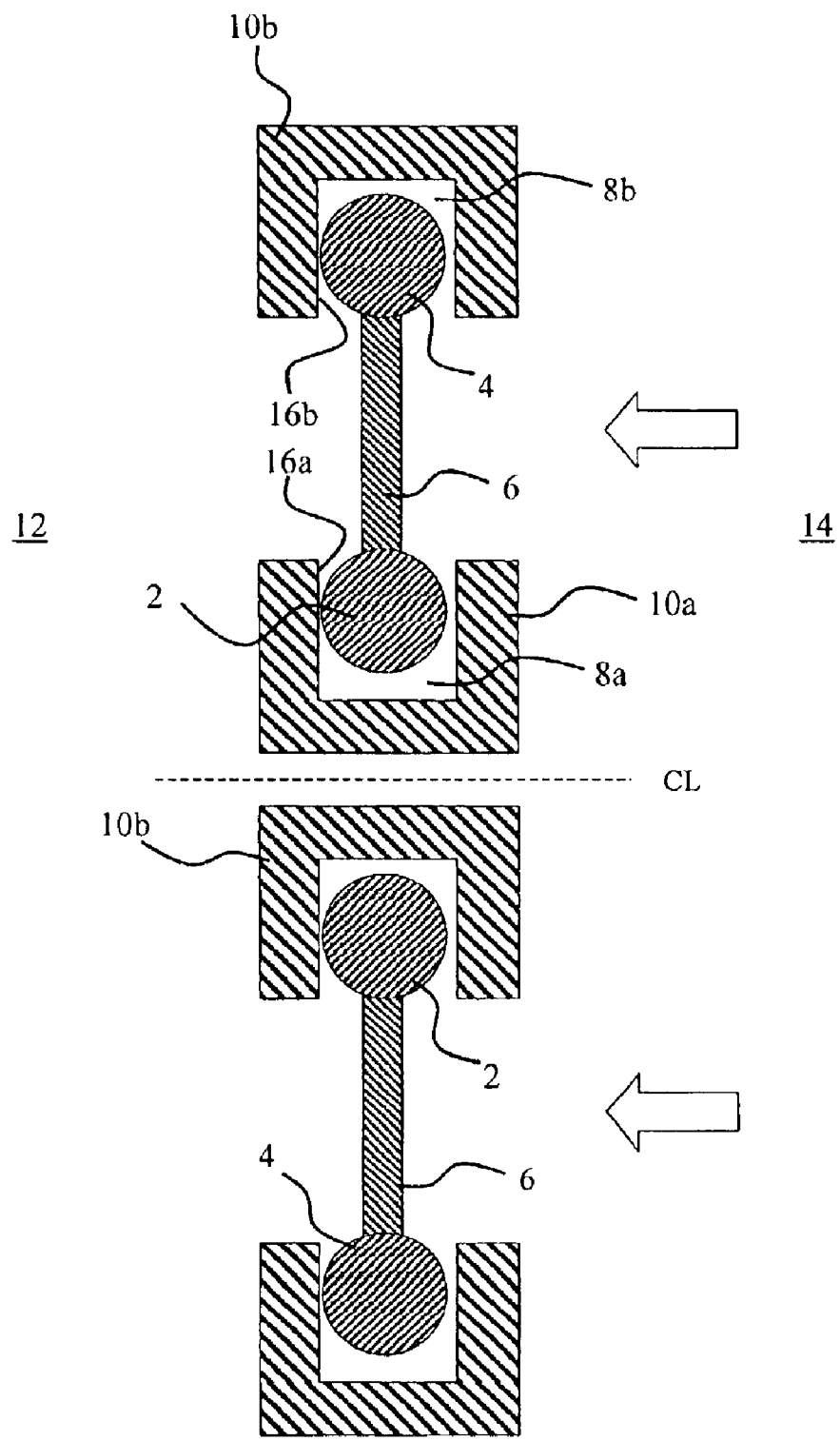
FIG. 1 is a radial cross-sectional view of a conventional membrane seal in accordance with the prior art.
Figure 2:
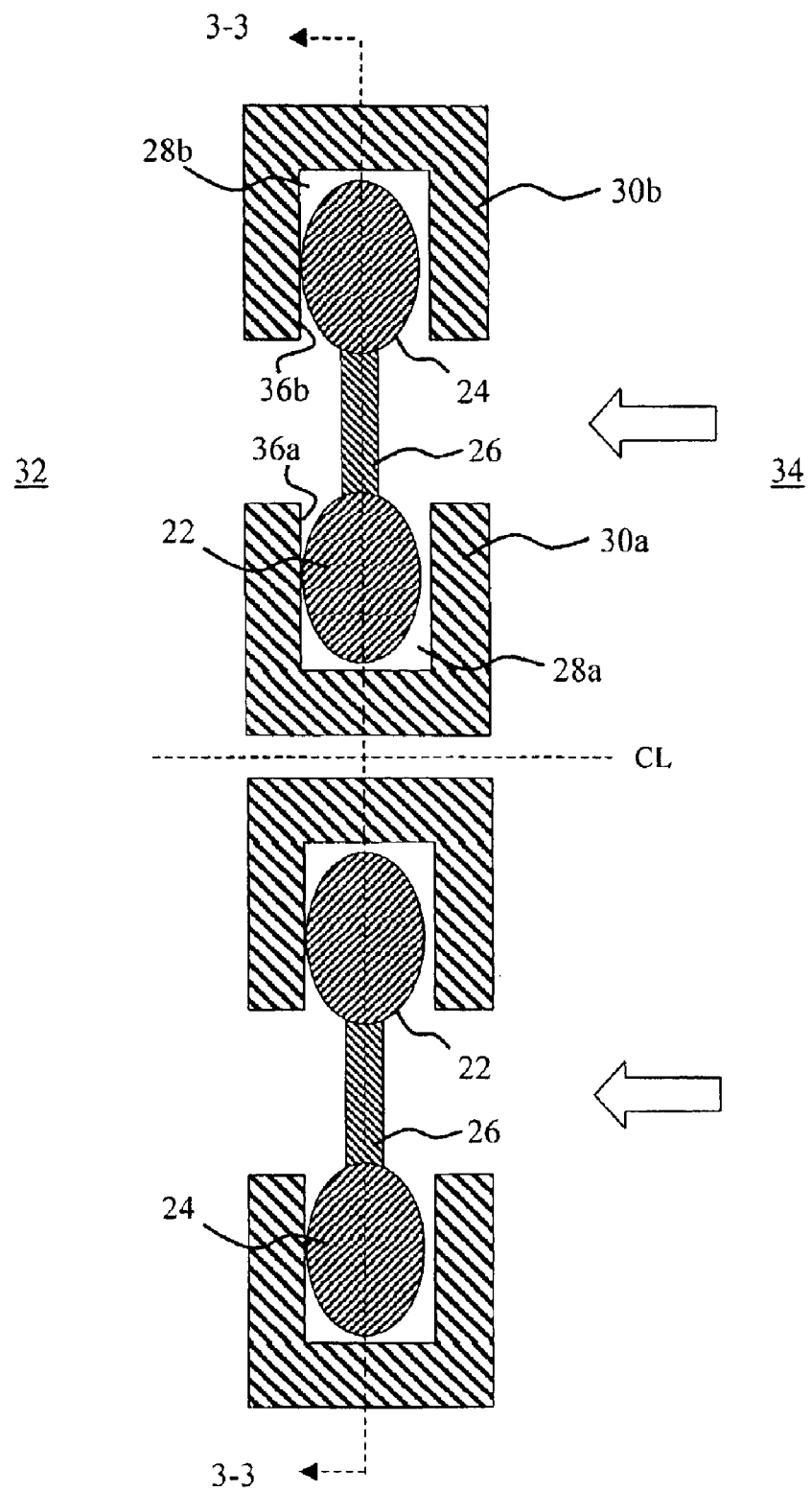
FIG. 2 is a radial cross-sectional view of a membrane seal in accordance with the present invention.

FIG. 2 shows a membrane seal 20 having a first radially inner annular sealing member 22 and a second radially outer annular sealing member 24 sealably connected together by an annular membrane 26. Both the first and second sealing members 22, 24 have an oval cross-section. The first and second sealing members 22, 24 are contained within annular sealing grooves 28a, 28b formed by mutually confronting radially inner and outer tracks 30a, 30b as described above. The two tracks 30a, 30b are mounted on a radially inner and radially outer portion of a gas turbine engine casing (not shown) respectively.

The membrane seal 20 is positioned between a low-pressure region 32 of the engine and a high-pressure region 34 of the engine. The axial width of the sealing grooves 28a, 28b is slightly wider than the axial width of the first and second sealing members 22, 24. This means that the first and second sealing members 22, 24 have a small amount of axial movement within the sealing grooves 28a, 28b. When the gas turbine engine is operating, the difference in pressure between the low-pressure region 32 of the engine and the high-pressure region 34 of the engine forces the membrane seal in the direction of the arrows. The first sealing member 22 is therefore forced into contact with a side face 36a of the track 30a to effect a fluid-tight seal. Similarly, the second sealing member 24 is forced into contact with a side face 36b of the track 30b to effect a fluid-tight seal.

Because the first and second members 22, 24 have an oval cross-section, there is a larger zone of contact between the first and second sealing members 22, 24 and the sealing grooves 28a, 28b than would be the case if the members 22, 24 had a circular cross-section. This reduces the amount wear on the first and second sealing members 22, 24 and ensures a good fluid-tight seal.

Figure 3:
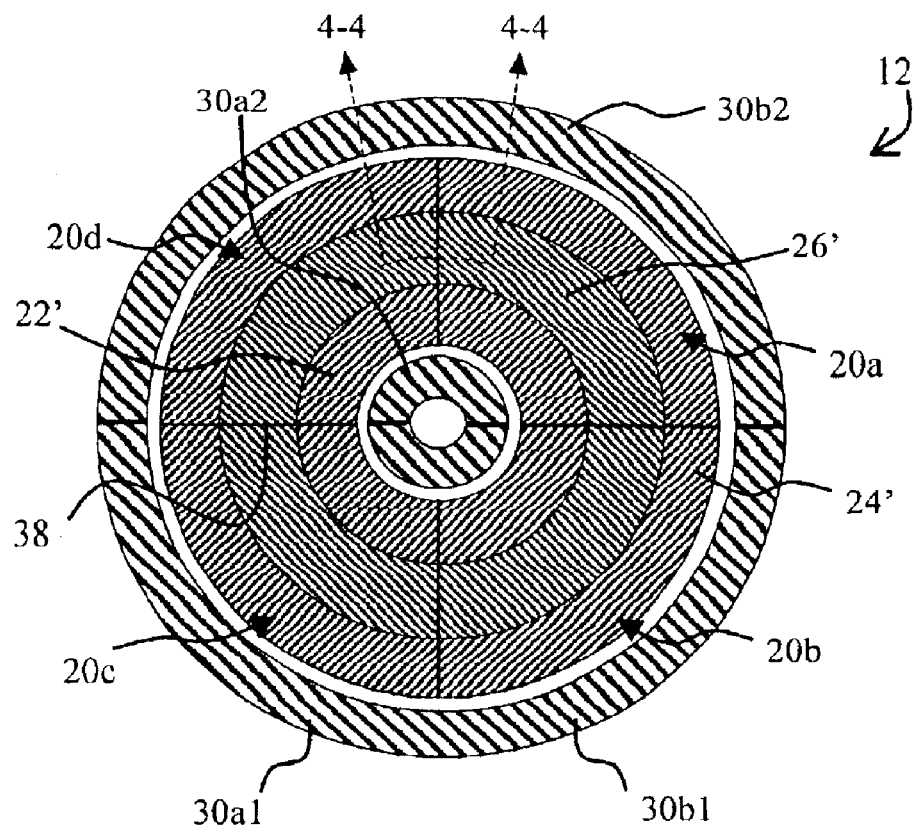
FIG. 3 is an axial cross-sectional view taken along line 3—3 of FIG. 2.

The membrane seal 20 is mounted in a horizontally split gas turbine engine. Such engines are formed in two halves and have a lower casing and an upper casing that can be bolted together once the rotating shaft and other components have been installed. As shown in FIG. 3, the radially inner track 30a is split into a lower track 30a1 mounted on a radially inner portion of the lower casing (not shown) and an upper track 30a2 mounted on a radially inner portion of the upper casing (not shown). The radially outer track 30b is split into a lower track 30b1 mounted on a radially outer portion of the lower casing (not shown) and an upper track 30a2 mounted on a radially outer portion of the upper casing (not shown). To allow the membrane seal 20 to be fitted easily it is formed from four membrane seal segments 20a–20d each having 90 degrees of arc. Each membrane seal segment includes a first radially inner arcuate sealing member 22' and a second radially outer arcuate sealing member 24' connected together by an arcuate membrane 26'.

Figure 4A:
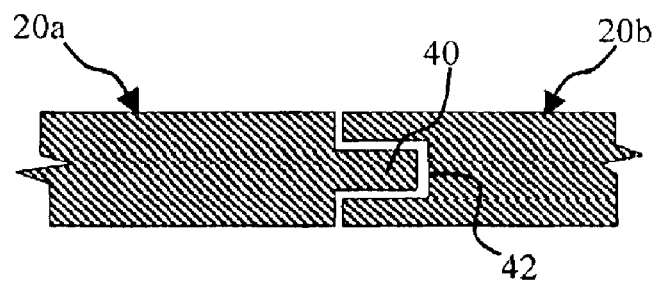
FIG. 4a is a cross-sectional view taken along a cylindrical surface shown by line 4—4 of FIG. 3.
Figure 4B:
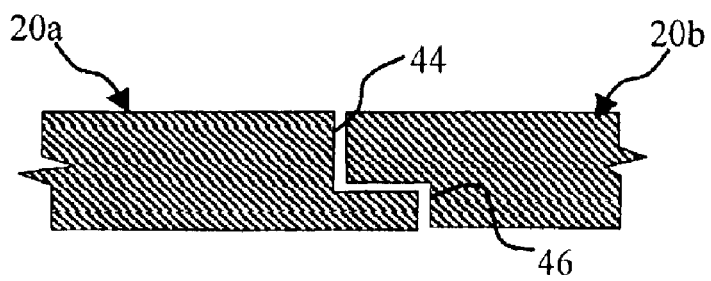
FIG. 4b is an alternative cross-sectional view taken along the cylindrical surface shown by line 4—4 of FIG. 3.

The membrane seal segments 20a–20d have radial edges 38 that butt together. To reduce fluid leakage through the membrane seal 20, each of the membrane seal segments 20a–20d includes a tongue 40 along one of its radial edges 38 and a groove 42 along its other radial edge as shown in FIG. 4a. Alternatively, each of the membrane seal segments 20a–20d includes a rebate 44 along one of its radial edges 38 and a complementary rebate 46 along its other radial edge as shown in FIG. 4b.

I claim:

1. A membrane seal comprising:
   a) a pair of oppositely facing annular sealing grooves; and
   b) a first annular sealing member received in one of the oppositely facing sealing grooves and a second annular sealing member received in the other of the oppositely facing sealing grooves, the first and second sealing members being sealingly connected together by an annular membrane, the sealing members and the membrane being annular when viewed normal to the membrane, and at least one of the first and second sealing members having an oval cross-section, and the other of the first and second sealing members having a circular cross-section;
   c) the first and second sealing members being axially slideable within the grooves, whereby a pressure difference across the membrane forces the first and second sealing members into contact with a side wall of each of the oppositely facing sealing grooves to effect a seal.

2. The membrane seal according to claim 1, wherein the first and second sealing members are tubular.

3. The membrane seal according to claim 1, wherein the first and second sealing members and the membrane are integrally formed.

4. The membrane seal according to claim 1, wherein the first and second sealing members and the membrane are formed from metal.

5. The membrane seal according to claim 1, wherein each of the pair of oppositely facing annular sealing grooves is formed in an annular track having a U-shaped cross-section.

6. The membrane seal according to claim 1, formed from a plurality of separate membrane seal segments, each segment comprising an arcuate first sealing member and an arcuate second sealing member sealingly connected together by an arcuate membrane.

7. The membrane seal according to claim 6, wherein each of the membrane seal segments has between 30 and 120 degrees of arc.

8. The membrane seal according to claim 6, wherein the number of membrane seal segments is four and each membrane seal segment has 90 degrees of arc.

9. The membrane seal according to claim 6, wherein each membrane seal segment includes a tongue on one of its radial edges and a groove on its other radial edge for receiving the tongue of an adjacent membrane seal segment.

10. The membrane seal according to claim 6, wherein each membrane seal segment includes a rebate on one of its radial edges and a complementary rebate on its other radial edge for cooperating with the rebate of an adjacent membrane seal segment.

11. The membrane seal according to claim 6, wherein radial edges of adjacent seal segments are formed with complimentarily shaped portions to reduce fluid leakage between the segments.

12. A gas turbine engine, comprising:
   a) a membrane seal having a pair of oppositely facing annular sealing grooves, a first annular sealing member received in one of the oppositely facing sealing grooves and a second annular sealing member received in the other of the oppositely facing sealing grooves, the first and second sealing members being sealingly connected together by an annular membrane, the sealing members and the membrane being annular when viewed normal to the membrane, at least one of the first and second sealing members having an oval cross-section, and the other of the first and second sealing members having a circular cross-section, the first and second sealing members being axially slideable within the grooves, whereby a pressure difference across the membrane forces the first and second sealing members into contact with a side wall of each of the oppositely facing sealing grooves to effect a seal; and b) wherein the membrane seal is positioned between a low-pressure region of the engine and a high-pressure region of the engine, and wherein the pressure difference between the low-pressure region of the engine and the high-pressure region of the engine forces the first and second sealing members into contact with the side wall of each of the oppositely facing grooves to effect the seal.

13. A membrane seal comprising:

a) a pair of oppositely facing annular sealing grooves; and b) a first annular sealing member received in one of the oppositely facing sealing grooves and a second annular sealing member received in the other of the oppositely facing sealing grooves, the first and second sealing members being sealingly connected together by an annular membrane, the first and second sealing members being axially slideable within the grooves, whereby a pressure difference across the membrane forces the first and second sealing members into contact with a side wall of each of the oppositely facing sealing grooves to effect a seal;

c) the membrane seal being formed from a plurality of separate segments of circles, each segment comprising an arcuate first sealing member and an arcuate second sealing member sealingly connected together by an arcuate membrane.

14. The membrane seal according to claim 13, wherein each of the membrane seal segments has between 30 and 120 degrees of arc.

15. The membrane seal according to claim 13, wherein the number of membrane seal segments is four and each membrane seal segment has 90 degrees of arc.

16. The membrane seal according to claim 13, wherein radial edges of adjacent seal segments are formed with complementarily shaped portions to reduce fluid leakage between the segments.

17. The membrane seal according to claim 16, wherein each membrane seal segment includes a tongue on one of its radial edges and a groove on its other radial edge for receiving the tongue of an adjacent membrane seal segment.

18. The membrane seal according to claim 16, wherein each membrane seal segment includes a rebate on one of its radial edges and a complementary rebate on its other radial edge for cooperating with the rebate of an adjacent membrane seal segment.

19. The membrane seal according to claim 13, wherein at least one of the first and second sealing members has an oval cross-section.

20. The membrane seal according to claim 19, wherein both the first and second sealing members have an oval cross-section.

21. A gas turbine engine, comprising:

a) a membrane seal having a pair of oppositely facing annular sealing grooves, a first annular sealing member received in one of the oppositely facing sealing grooves and a second annular sealing member received in the other of the oppositely facing sealing grooves, the first and second sealing members being sealingly connected together by an annular membrane, the first and second sealing members being axially slideable within the grooves, whereby a pressure difference across the membrane forces the first and second sealing members into contact with a side wall of each of the oppositely facing sealing grooves to effect a seal, the membrane seal being formed from a plurality of separate segments of circles, each segment comprising an arcuate first sealing member and an arcuate second sealing member sealingly connected together by an arcuate membrane, and b) the membrane seal being positioned between a low-pressure region of the engine and a high-pressure region of the engine, and the pressure difference between the low-pressure region of the engine and the high-pressure region of the engine forcing the first and second sealing members into contact with the side wall of each of the oppositely facing grooves to effect the seal.

* * * * *